Oct. 29, 1957 W. PECHY 2,811,282
MACHINE FOR FILLING LIQUIDS INTO CONTAINERS
Filed May 8, 1956 2 Sheets-Sheet 2
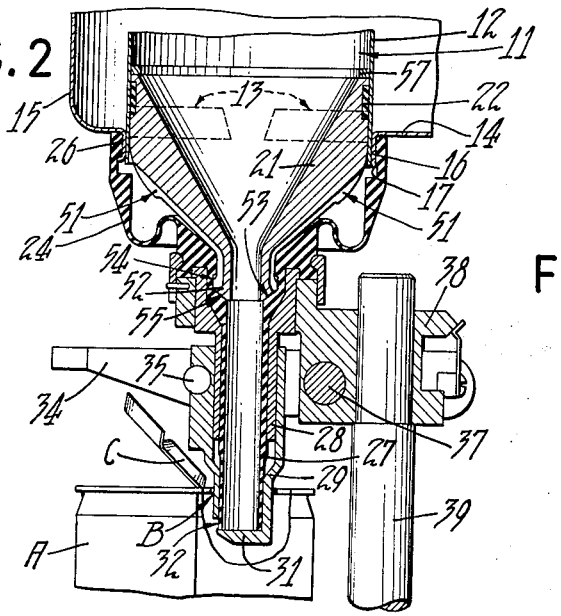
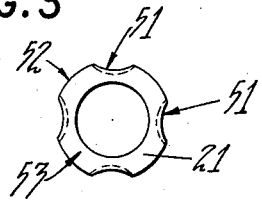
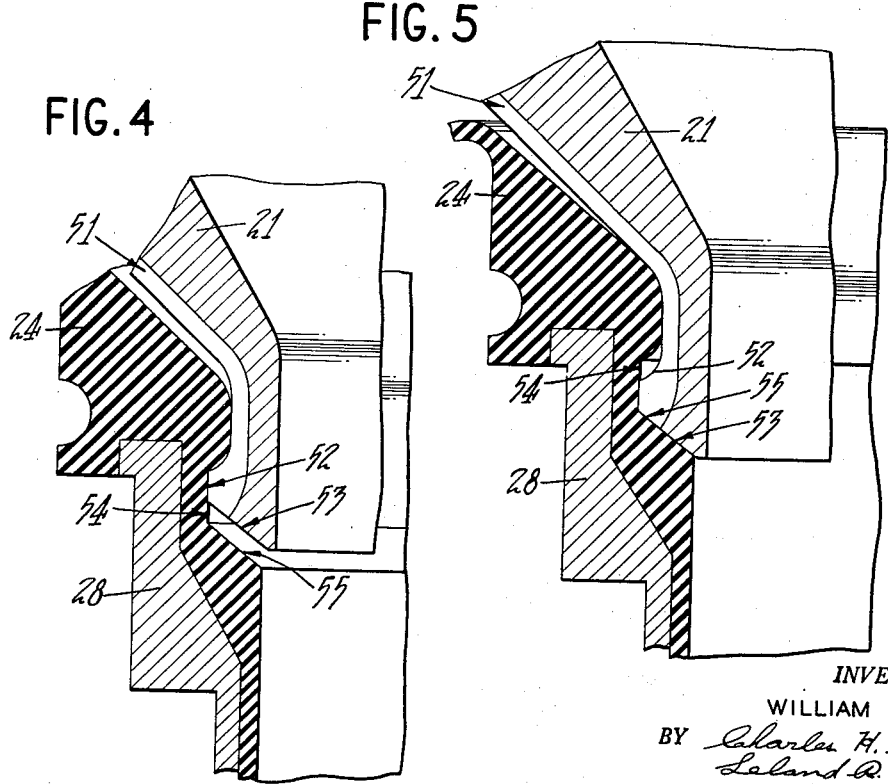
INVENTOR.
WILLIAM PECHY

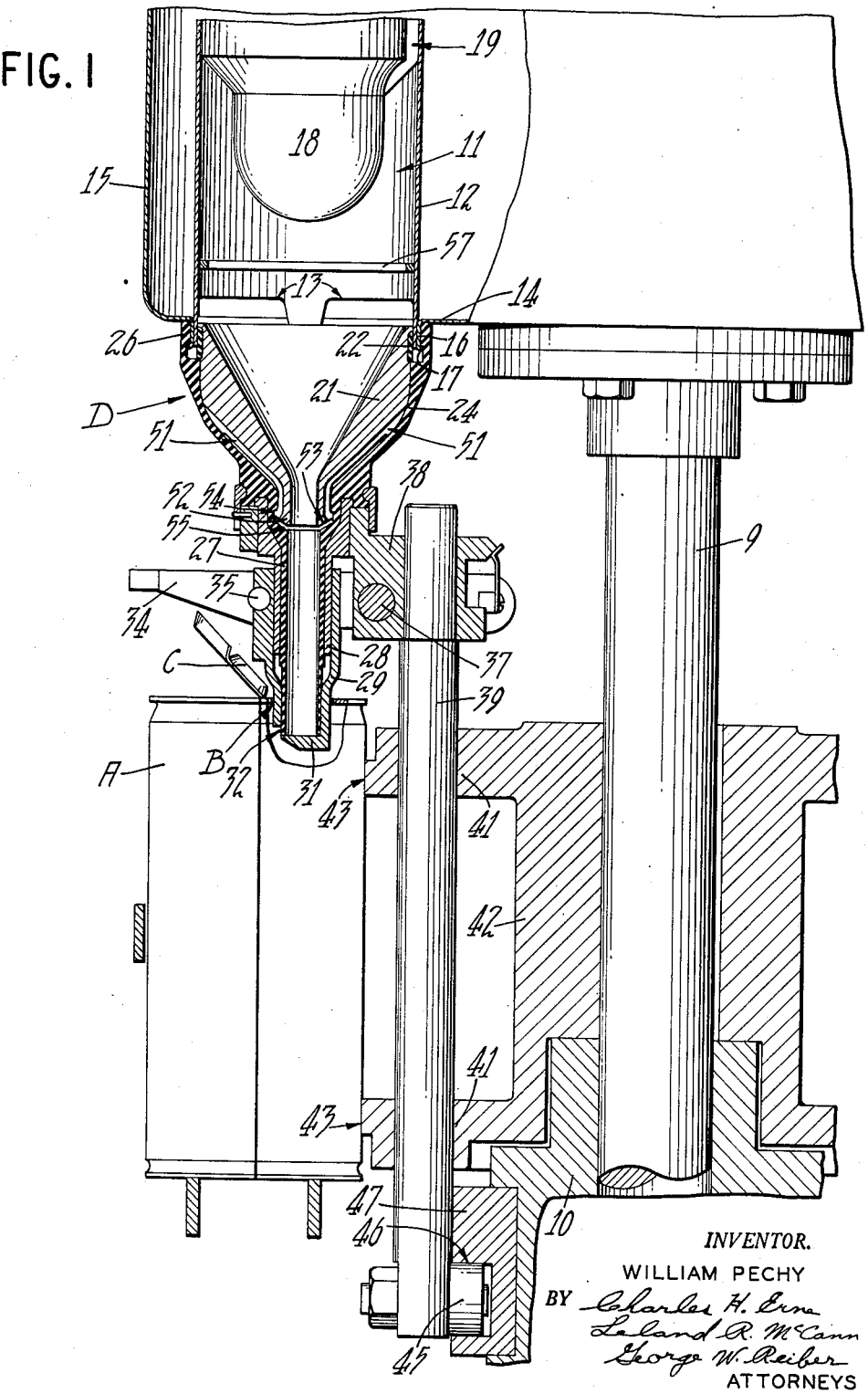

2,811,282
MACHINE FOR FILLING LIQUIDS INTO CONTAINERS

William Pechy, Belmar, N. J., assignor to American Can Company, New York, N. Y., a corporation of New Jersey Application May 8, 1956, Serial No. 583,392

6 Claims. (Cl. 222—108)

The present invention relates to machines for filling liquids, such as milk and the like, into fibre containers and has particular reference to an improved filling nozzle for such machines. This is an improvement on the filling nozzle disclosed in United States Patent Number 2,755,980, issued July 24, 1956, to S. S. Jacobs and W. Pechy on Machine for Filling Liquids into Containers.

An object of the invention is the provision of a filling nozzle for a milk filling machine wherein milk which seeps into parts of the nozzle and becomes trapped may be readily drained away so as to maintain sterile conditions in the nozzle at all times.

Numerous other objects and advantages of the invention will be apparent as it is better understood from the following description, which, taken in connection with the accompanying drawings, discloses a preferred embodiment thereof.

Referring to the drawings:

Figure 1 is a sectional view taken through the filling head portion of a filling machine embodying the instant invention, with parts broken away and with a container in place under the head;

Fig. 2 is a fragmentary view similar to Fig. 1, showing parts of the filling head in a different position;

Fig. 3 is an enlarged plan view of one end of one of the parts of the filling head; and Figs. 4 and 5 are enlarged fragmentary sectional views of certain parts of the filling head showing in detail the relation of the parts in different positions.

As a preferred or exemplary embodiment of the invention the drawings illustrate the filling head portion of a conventional rotary type filling machine having a plurality of heads traveling along a circular path of travel for filling milk products into rectangular fibre containers A (Fig. 1) of the character disclosed in United States Patent 2,085,979, issued July 6, 1937, to John M. Hothersall on Container. Such a container A is formed with a filling and dispensing opening B located in the top of the container and sealed, after the container is filled, by a friction plug C hingedly attached to the top of the container adjacent the opening.

As disclosed in the above mentioned Jacobs et al. Patent 2,755,980, the containers A upon entering the machine are in an upright position with their filling openings B uncovered or open and with the closure plugs C hinged upright adjacent the openings. In the machine each container A is positioned under a filling nozzle D and raised slightly to position the nozzle into the opening B of the container for the filling operation.

The filling nozzle D is located at the open bottom end of a vertically disposed measuring chamber 11 (Fig. 1) enclosed by a tubular housing 12 formed with a plurality of inlet ports 13 in the side wall of the housing adjacent its open bottom end. The housing 12 is secured in and extends upwardly from a bottom wall 14 of a rotatable supply tank 15 which carries a supply of the milk to be filled into the containers A in measured quantities or charges. The tank is mounted on the upper end of a vertical rotatable support shaft 9 journaled in bearings in a frame 10. A depending flange 16 having an outwardly projecting terminal bead or flange 17 on the tank bottom holds the housing 12 in place.

The ports 13 in the housing 12 are normally open and thus admit milk from the tank 15 into the chamber 11. When the chamber is filled a measured charge of milk for one container is segregated from the milk in the tank. An adjustable volume control plunger 18 having a vent channel 19 is provided in the chamber 11 to define the capacity of the measuring chamber.

The filling nozzle D which is located at the bottom of the measuring chamber 11 to dispense or deliver the measured charge of milk in the chamber, includes an inverted conical shaped hollow annular cut off member 21 having its upper wide end slideably disposed in the lower end of the measuring housing 12, immediately below the inlet ports 13. A resilient gasket 22, preferably made of rubber or other suitable gasket material, surrounding the outer face of the wide end of the conical member 21, travels with it and presses against the inner face of the housing 12 to prevent leakage of milk from the measuring chamber 11. However, the gasket 22 after some use becomes worn and some leakage or seepage from the measuring chamber 11 does take place. The instant invention compensates for this leakage as will be hereinafter more fully explained.

The conical cut off member 21 is surrounded by a close fitting resilient, compressible nozzle member 24, preferably made of rubber or the like material. This nozzle member 24 is substantially the same shape as the cut off member 21 and is in immediate engagement with the cut off member. At its upper large end the nozzle member 24 is formed with an internal annular bead 26 which surrounds the depending flange 16 on the tank bottom 14 and fits over the flange terminal bead 17 to hold the nozzle member securely in place in a leakproof joint. At the small end of the cut off member 21, the nozzle member 24 is provided with a relatively long depending tubular discharge sleeve section 27 which extends down into the container A to be filled.

A major portion of the length of the sleeve section 27 of the nozzle member 24 is encased in a surrounding bearing sleeve 28 which carries, for vertical movement thereon, a valve sleeve 29 having at its lower end a valve seat 31 which extends across and normally closes the lower end of the sleeve section 27. An opening 32 adjacent the valve seat 31 delivers the milk into the container when the valve seat is open. Opening of the valve seat 31 at the proper time preferably is effected by a cam actuated arm 34 which is attached by a pin 35 to the valve sleeve 29. The inner end of the arm 34 is mounted on a pivot pin 37 in a block 38 which is secured to the nozzle member 24 and which is mounted on the upper end of a vertical actuating rod 39 slidably mounted in bearings 41 formed in a turret 42 carried on and rotating with the tank support shaft 9. The turret 12 is provided with peripheral pockets 43 to advance the containers through the machines. The rod 39 is moved vertically by cam roller 45 which is carried on the lower end of the rod and which traverses a cam groove 46 of a stationary cam 47 mounted on the frame 10.

In operation, the stationary cam 47 raises the lifter rod 39 at the proper time as the filling head travels along its path of travel as mentioned hereinbefore, and this raises the lifter block 38. This lifting action pushes the small end of the resilient nozzle member 24 and the cut off member 21 surrounded thereby, upwardly toward the supply tank 15 and thus compresses the nozzle member 24 causing it to buckle or collapse as shown in Fig. 2 to compensate for the upward travel of the lower small end. This collapsing of the nozzle member 24 permits the cut off member 21 to ride up into the measuring chamber 11 to a position above the inlet ports 13 to close the ports and thus segregate the measured charge of milk in the measuring chamber from the milk in the tank. Excess milk in the chamber is pushed up through the vent channel 19 and flows back into the tank. The milk left in the chamber 11, the vent channel 19, and the cut off end nozzle member parts when the cut off member 21 reaches the peak of its up travel, is the predetermined measured charge to be delivered into the container A.

With the charge of milk segregated in the chamber 11, the valve seat 31 at the lower end of the nozzle member 24 is opened by actuation of the arm 34 to permit the milk to flow into the container. When the entire charge of milk has been delivered, the valve seat 31 is closed and the nozzle member 24 is then lowered to uncover the inlet ports 13 for a repeat measuring operation for the next container.

Any milk that seeps from the measuring chamber 11 past the gasket 22 into the space between the cut off member 21 and the nozzle 24 during repeated collapsing operations of the latter as mentioned hereinbefore is drained off immediately so as to prevent trapping and contamination of the seeped milk. For this purpose the outer face of the cut off member 21 is provided with a plurality of clearance or drainage grooves 51 (Figs. 1, 2, 3, 4 and 5) which are spaced circumferentially around the member and which extend down along the member to its lower or narrow end. If desired these drainage grooves 51 can also be provided in the inner face of the nozzle member 24, or may be provided in both the cut off and the nozzle members.

The drainage grooves 51, preferably terminate at their upper ends in spaced relation to the gasket 22 as shown in Figs. 1 and 2. At their lower ends the drainage grooves 51 extend into and through an outwardly projecting bead 52 formed on the lower narrow end of the cut off member 21, the grooves opening onto a tapered or beveled sealing face 53 which forms the bottom of the bead and the narrow end of the cut off member (see Figs. 4 and 5). The bead 52 is disposed in a cooperating annular recess 54 formed in the small end of the nozzle member 24. The recess 54 is slightly wider than the bead 52 to provide for vertical movement or play of the bead in the recess. The nozzle member 24 adjacent the lower edge of the recess 54 is also provided with a tapered or beveled sealing face 55 corresponding to and for cooperation with the sealing face 53 of the cut off member 21.

When the cut off member 21 and the nozzle member 24 are in milk measuring position as shown in Fig. 1 to permit milk from the tank 15 to flow into the measuring chamber 11, the bead 52 on the narrow end of the cut off member 21 is located in the upper portion of the recess 54 in the nozzle member 24 so that the sealing faces 53, 55 of the members are separated or spaced apart as shown in Figs. 1 and 4. In this position of the sealing faces, the open lower ends of the drainage grooves 51 are free to drain out any milk that may have previously seeped in between the contacting faces of the cut off member 21 and the nozzle member 24. This drained milk flows down over the nozzle member sealing face 55 and enters the sleeve section 27 of the nozzle member 24 for discharge through the valve opening 31 when it is opened.

When the nozzle member 24 moves up to lift the cut off member 21 into the measuring chamber 11 so as to cut off the inlet ports 13, the sealing face 53 on the narrow end of the cut off member engages against the sealing face 55 of the small end of the nozzle member and thereby effects a seal which cuts off the open ends of the drainage grooves 51 so as to prevent a flow of milk through the drainage grooves through a direct communication between the drainage grooves and the inlet ports 13 when the gasket 22 rises above the ports as shown in Fig. 2. In order to insure sealing contact between the sealing faces 53, 55, the upper end of the cut off member 21 when at the peak of its travel, engages against a stationary annular stop ring 57 (Figs. 1 and 2) which is located inside of and is secured to the measuring chamber housing 12. Engagement of the cut off member against this ring, presses the sealing faces 53, 55 tightly together.

Thus through repeated collapsing of the upper portion of the resilient nozzle member 24 and its return to its normal lowered position, the drainage grooves or channels 51 are alternately closed and opened to seal and drain away any excess milk that may seep in between the cut off member 21 and the nozzle member 24 and thereby eliminate any trapping and contamination of such excess milk. After shut down of the machine at the end of a day's run, when the machine is thoroughly cleaned and sterilized, the drainage grooves 51 facilitate thorough cleaning and sterilization of the contacting faces of cut off and nozzle members and thereby eliminate any chance of contamination from this source.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling liquids into containers, the combination of a liquid supply tank, a measuring chamber housing communicating with said tank for measuring out from said tank a charge of liquid to be filled into a container, a cut off member slidably disposed in said housing, a resilient compressible nozzle member surrounding said cut off member in immediate contact therewith, means for compressing said nozzle member to shift said cut off member in said housing to cut off communication between said housing and said tank so as to segregate said measured charge of liquid in said housing, a normally closed valve element at the delivery end of said nozzle member, means for opening said valve element to deliver said segregated charge of liquid into a container, and drain means disposed between said cut off member and said nozzle member in the region of their immediate contact for draining off excess liquid trapped between said members through shifting of said cut off member.

2. The combination defined in claim 1 wherein said drain means is at least one drainage groove formed in at least one of said members, said groove having an open end leading toward the delivery end of said nozzle member.

3. The combination defined in claim 2 wherein there is provided cooperating opposed relatively spaced sealing faces on said members adjacent the open end of said drainage groove, said sealing faces between them providing a passageway for the draining off of said excess liquid from said groove in the normal uncompressed position of said nozzle member and providing a tight seal between them to close the open end of said groove in the compressed position of said nozzle member.

4. The combination defined in claim 3 wherein there is provided a stop element disposed in the path of travel of said cut off member and engageable with said member to insure sealing engagement between said sealing faces during compression of said nozzle member.

5. The combination defined in claim 4 wherein said cut off member is an inverted conical shaped hollow member having its wide end slidably disposed in said housing and wherein said stop element is an annulus disposed in said housing for engagement against the wide end of said cut off member.

6. The combination defined in claim 1 wherein said cut off member is an inverted conical shaped member having its wide end slidably disposed in said housing and having its narrow end extended below said housing and having an unrestricted opening through said member, and wherein said nozzle member is an inverted conical member having its wide end disposed adjacent said housing and having its narrow end freely surrounding the narrow end of said cut off member and extending beyond said cut off member as a delivery section having an unrestricted opening therethrough.

No references cited.